United States Patent [19]

Berenson et al.

[11] Patent Number: 5,509,517
[45] Date of Patent: Apr. 23, 1996

[54] FLYING WEDGE (CENTRIPETAL RETRACTOR) ASSEMBLY

[75] Inventors: Roger E. Berenson, Redondo Beach; William C. Bowling, Jr., Simi; Brian W. Lariviere, Calabasas; Maynard L. Stangeland, Thousand Oaks, all of Calif.

[73] Assignee: Rockwell International Corporation, Seal Beach, Calif.

[21] Appl. No.: 275,477

[22] Filed: Jul. 15, 1994

[51] Int. Cl.$^6$ .................................................. F16D 13/06
[52] U.S. Cl. ..................... 192/65; 192/110 B; 192/104 R
[58] Field of Search ........................... 192/104 R, 103 A, 192/65, 110 B; 384/101

[56] References Cited

U.S. PATENT DOCUMENTS

| | | | |
|---|---|---|---|
| 2,937,730 | 5/1960 | Quennville | 192/103 A |
| 3,360,310 | 12/1967 | Hiatt et al. | 384/102 |
| 3,759,588 | 9/1973 | Anderson | 384/101 |
| 4,061,439 | 12/1977 | Pech | 192/103 A X |
| 5,348,401 | 9/1994 | Justak et al. | 384/101 |

*Primary Examiner*—Richard M. Lorence
*Attorney, Agent, or Firm*—George A. Montanye; Harry B. Field; Steven E. Kahm

[57] ABSTRACT

The flying wedge clutch assembly is a speed actuated coupling device that provides low speed axial load and torque transmission and disengages for increased shaft motion at higher speeds. The flying wedge clutch assembly is a compact and lightweight design, roughly equivalent to a conventional ball bearing assembly in a typical turbopump application. Advantageously, the flying wedge clutch assembly can be used in high speed rotating machines with radial hydrostatic bearings eliminating the speed and life limitations normally attributed to rolling element bearings.

7 Claims, 7 Drawing Sheets

*Fig. 1*

(PRIOR ART)

FLYING WEDGE (CENTRIPETAL RETRACTOR) ASSEMBLY

TABLE OF CONTENTS

1. BACKGROUND OF THE INVENTION
2. SUMMARY OF THE INVENTION
3. BRIEF DESCRIPTION OF THE DRAWINGS
4. DETAILED DESCRIPTION OF SPECIFIC EMBODIMENT
   4.1 Overview of Design
   4.2 Operational Overview
   4.3 Mechanical View of the Flying Wedge
   4.4 Design Factors for a Flexible Flying Wedge
   4.5 Description of the Preload Ring and Retainer
   4.6 Test Data for an Illustrative Implementation
   4.7 Advantages of the Invention
5. CLAIMS
   ABSTRACT

BACKGROUND OF THE INVENTION

In prior art rotating machinery designs (e.g., liquid rocket engine turbopumps), rolling-element bearings provide radial and axial support of a rotating shaft (referred to as the "rotor") assembly. See FIG. 1. In these designs, a single ball bearing or a pair of preloaded angular contact ball bearings 105 is mounted to the shaft to provide axial thrust capabilities and to control the rotor 135 axial position at low operating speeds. As rotor speed increases, sufficient pressure is provided by the pump to the balance piston cavity 120 to react all of the forces acting on the rotor and to control the rotor axial position within the balance piston position controls (high pressure orifice 125 and low pressure orifice 130). The locations of the ball bearing axial stops, 110 and 115, are selected to prevent axial contact between rotating and stationary parts while at low shaft speed but far enough apart to permit significant rotor axial travel to take advantage of the maximum load capacity of balance piston systems at the higher operating speeds.

Figure 1:
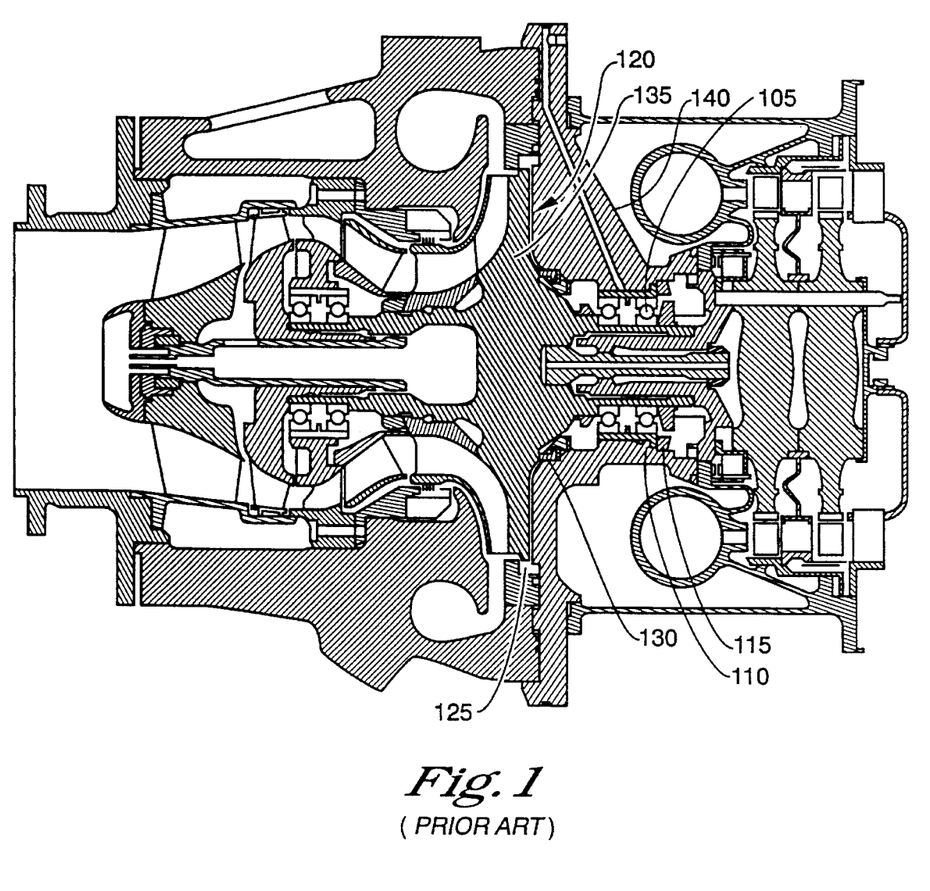
FIG. 1 is a cross section representation of a turbopump comprising conventional rolling-element ball bearings.

Hydrostatic bearings, which use pressurized fluid films to radially support the rotating assembly, are a potentially lower life-cycle cost alternative to conventional rolling element bearings for high speed, long life turbo machines. Unlike rolling-element bearings, radial hydrostatic bearings provide no axial rotor support. Because of this, a way of controlling the start-up and shut-down (i.e., transient) axial thrust is required. One method of controlling transient axial thrust uses a ball bearing whose outer race is mounted to the bearing support 140 but whose inner race is not mounted on the shaft, and is only axially engaged with the rotor 135 during start-up and shut-down. At operating speed, the balance piston controls the axial position of the shaft. The axial stops 110, 115 are located such that the shaft does not contact the axial faces of the bearing once the balance piston controls the shaft position but prevent rubbing of the balance piston high and low pressure orifices 125 and 130 while operating at low speed. This, in tun, requires that the rotor axial stops 110, 115, be farther apart at operating speeds than during either start-up or shut-down. One means of accomplishing this is through a rotating clutch mechanism.

As is well known to those of ordinary skill, the purpose of a rotating clutch is to transmit torque through axial contact and, generally speaking, is intended to engage and disengage selectively, either actively (for example, by pushing in the clutch pedal of an automobile) or passively (for example, in response to specific events such as increases in engine speed).

The invention relates to a passive rotational clutch mechanism that utilizes the change of centripetal force of a rotating shaft to produce the axial clutching against the bearing, i.e., a retracting or disengaging motion as speed increases and an engaging motion as speed decreases.

SUMMARY OF THE INVENTION

An apparatus in accordance with the invention is referred to herein as a flying wedge centripetal retractor or, more simply, a flying wedge assembly. A flying wedge assembly provides automatic, repetitive clutching of a rotating assembly (e.g., the shaft in a high speed turbopump) by reacting transient axial loads at low rotor speeds while retracting and disengaging at higher operating speeds.

DETAILED DESCRIPTION OF SPECIFIC EMBODIMENT

4.1 Overview of Design

One illustrative embodiment of the invention is described below as it might be implemented for a liquid rocket engine's turbopump such as the MK29-FD manufactured by Rocketdyne.

Figure 2:
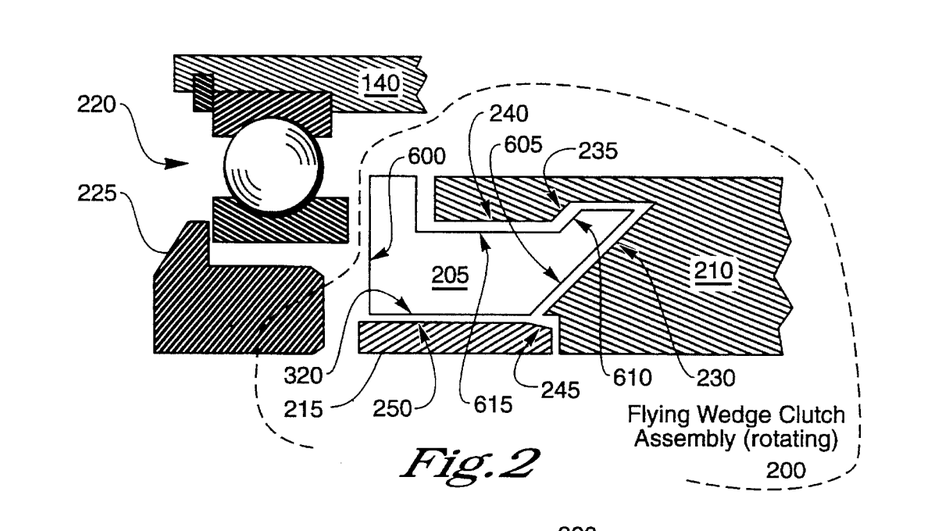
FIG. 2 is a block diagram representation of an illustrative embodiment of the invention showing key components and surfaces thereof.

Referring to FIG. 2, the flying wedge clutch assembly 200 consists of three parts: flying wedge 205, retainer 210, and preload ring 215. The flying wedge 205 is a continuous ring, in the general shape of a Greek Key, whose hoop continuity is interrupted by meridional (axial-radial) slots inset into both sides of the ring. These discontinuities, shown in various views in FIG. 3, give the flying wedge 205 flexibility which allows it to expand circumferentially and thus grow radially.

Retainer 210 encapsulates flying wedge 205 and limits centripetal growth at high speed. The conical surfaces 230 and 235 on the retainer 210 guides the flying wedge axially as the ring grows radially. The preload ring 215 prestresses the flying wedge 205, establishing the speed at which the centripetal growth, or clutching action, of the flying wedge begins.

Figure 3A:
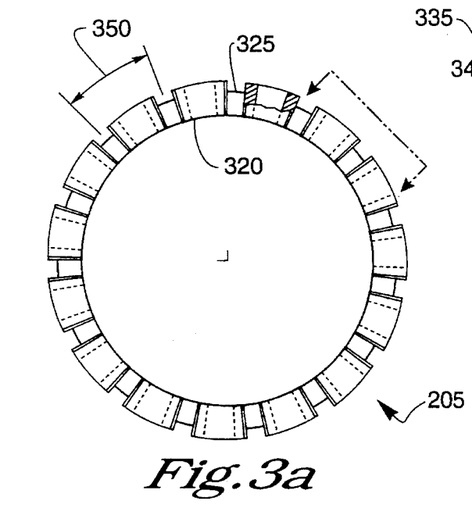
FIGS. 3a through 3c show various views of the illustrative embodiment's flying wedge element.
Figure 3B:
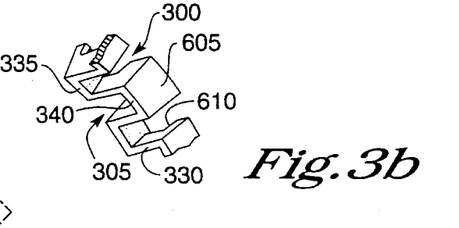
Figure 3C:
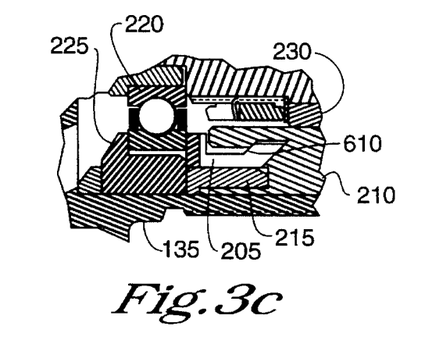

As shown in FIGS. 2 and 3, the flying wedge clutch assembly 200 is placed adjacent to a ball bearing assembly 220 whose function is to react transient axial loads at low speeds during turbopump start-up and shut-down operations.

With the flying wedge in the assembled condition, shaft axial motion is constrained by the bearing 220 by transmitting thrust into the bearing support 140 to protect the pump's rotating components from contacting stationary components.

Figure 4:
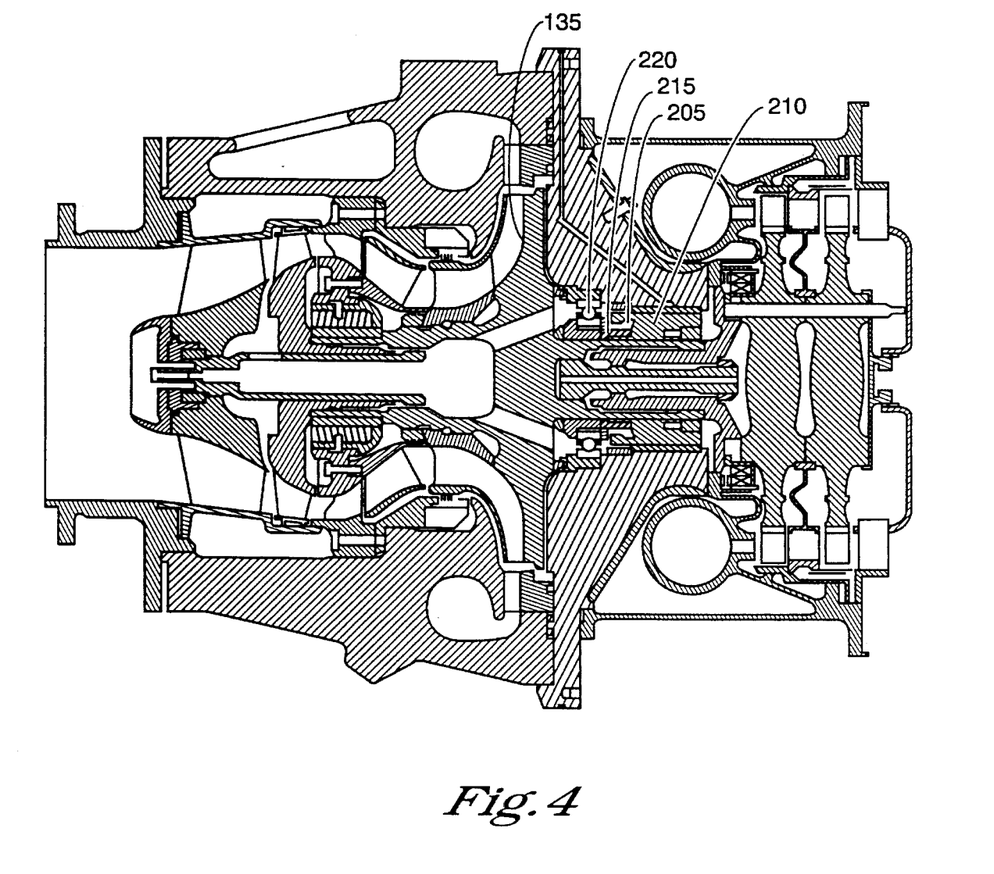
FIG. 4 shows a cross section of a turbopump utilizing the illustrative embodiment.

A cross section of the MK29-FD turbopump with the flying wedge clutch assembly 200 installed is shown in FIG. 4. An enlarged partial view of FIG. 4, specifically that area in which the flying wedge clutch assembly is found, is shown in FIG. 5.

4.2 Operational Overview

Figure 5:
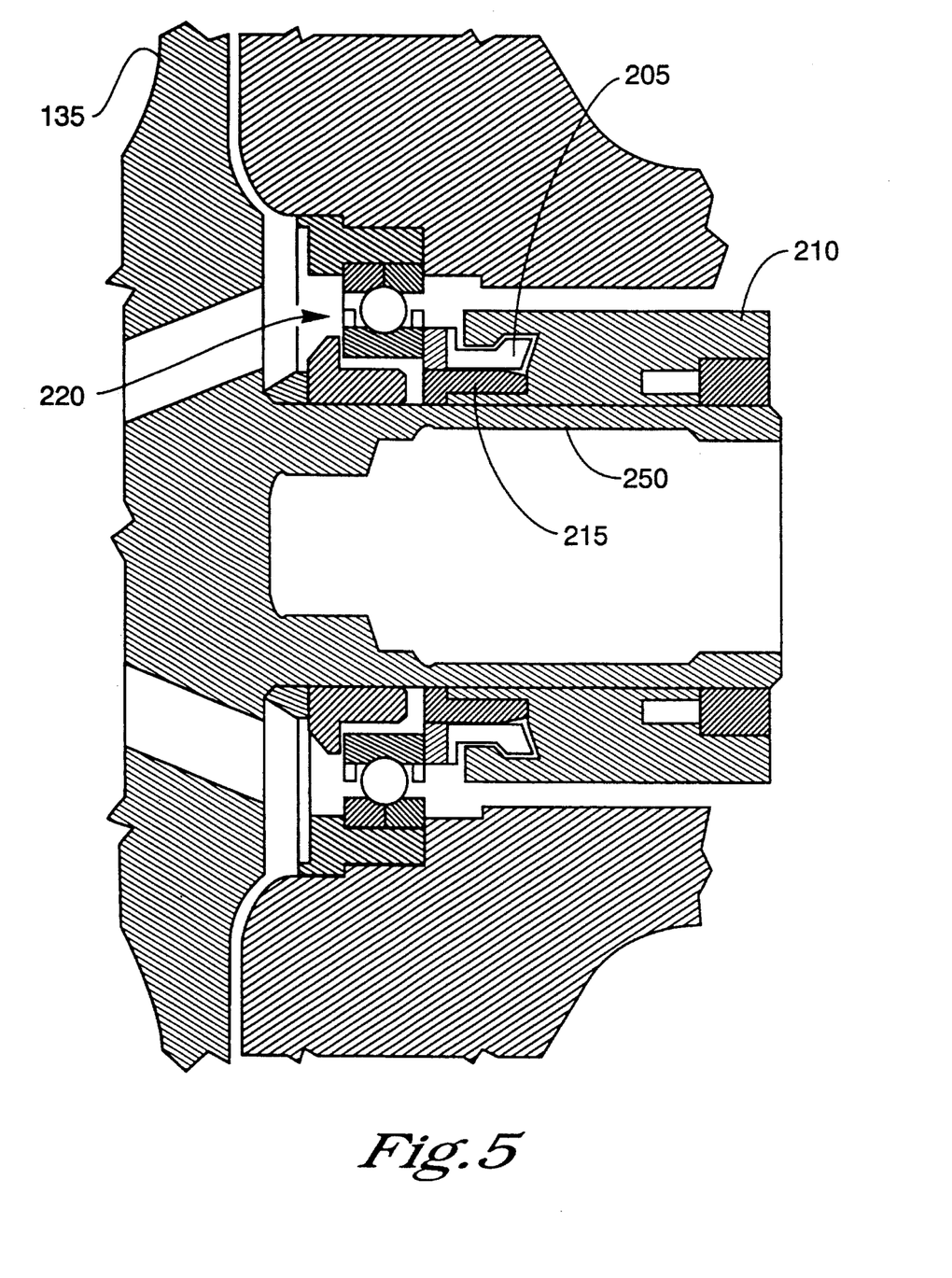
FIG. 5 shows a cross section enlarged portion of FIG. 4.

When configured as shown in FIGS. 3a–3c, and fitted into a rotating machine as shown in FIGS. 4 and 5, the flying wedge 205 can expand significantly in the radial direction over a predetermined speed range.

As shown in FIG. 2, surface 600 is flat in the radial plane and contacts the inner race of the ball bearing assembly 220. Surface 605 and surface 610 are similarly angled. The flying wedge 205 is radially expanded and preloaded using the preload ring 215 which, in an unassembled condition, has a larger outer diameter than the flying wedge's inner diameter. The forced radial expansion of the flying wedge 205 by the preload ring 215 results in a radial pressure on the flying wedge's inner surface; this provides the preload which controls the operational speed range of the invention.

As the flying wedge clutch assembly rotates, axial load can be transmitted from shaft 135 through retainer 210 and into flying wedge 205, via surface 605, into bearing assembly 220 via surface 600, until the centripetal load due to the flying wedge's angular velocity overcomes the flying wedge's preset tension (set by the preload ring 215). Once the preload tension is overcome, the flying wedge is able to expand in the radial direction. The rotational speed at which the flying wedge overcomes the preload tension is known as the lift-off speed.

As the flying wedge expands, it translates axially due to angled surface 610 and the retainer's matching surface 235. Continued expansion causes surface 600 to disengage from the bearing assembly's 220 inner race. As rotational speed increases further the flying wedge continues to expand radially and translate axially until its diameter 615 contacts the retainer's 210 overhang diameter 240 which halts further expansion. As rotational speed is decreased, the flying wedge returns to its initial position by sliding radially and axially inward along surfaces 605 and 610.

Figure 6:
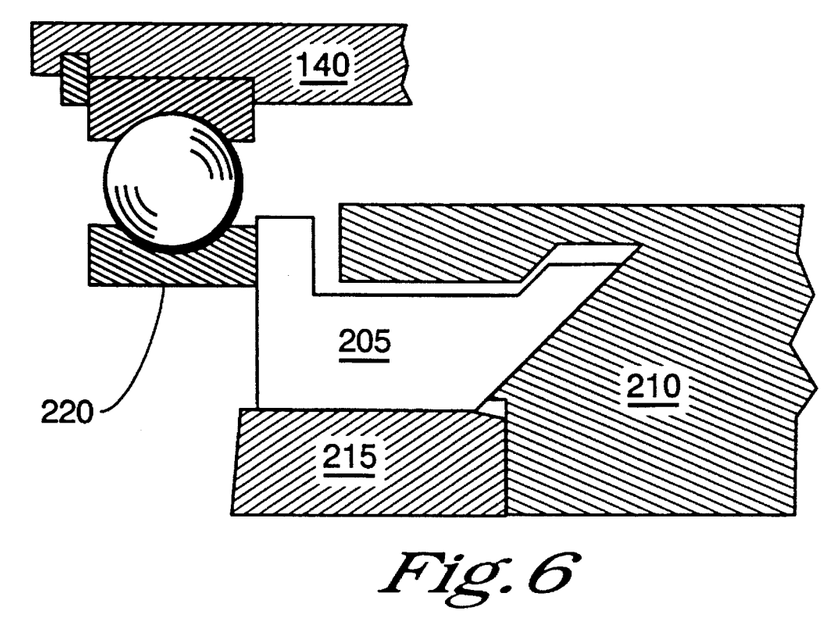
FIGS. 6 and 7 are block diagram representations of the illustrative embodiment in the engaged and retracted states.
Figure 7:
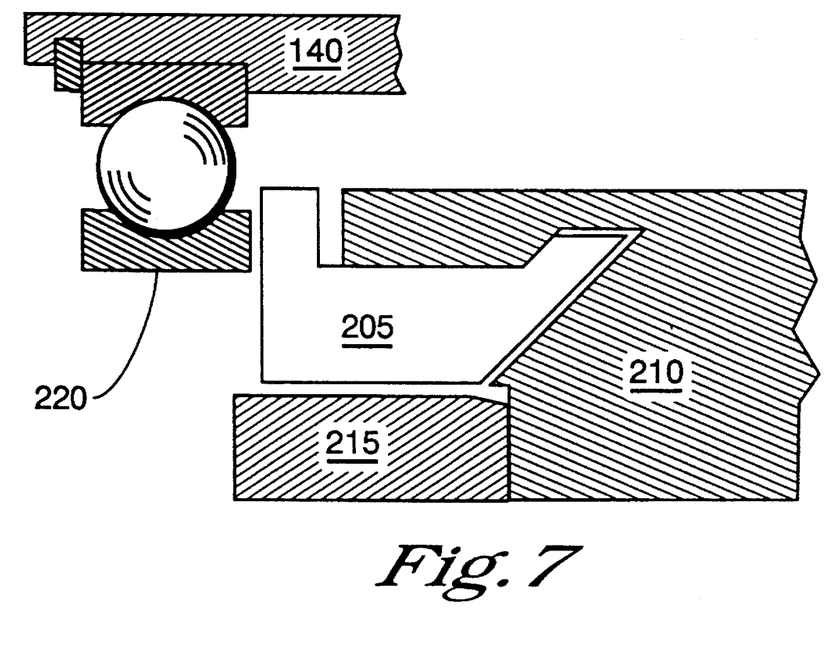

FIG. 6 is a schematic representation of the flying wedge when rotating below a speed sufficient to overcome the preload ring's 215 preset tension limit, i.e., below the flying wedge's lift-off speed. FIG. 7 is a schematic representation of the flying wedge when rotating at full operational speed, i.e., when retracted.

4.3 Mechanical View of the Flying Wedge

As shown in FIGS. 3a–3c, the flying wedge 205 consists of a cylindrical metallic ring. The hoop continuity of the ring is interrupted with meridional slots 300 and 305 alternating on opposite sides of the ring. (This structure, a hoop whose cylindrical continuity is broken in a regular fashion, is known as a GreekKey.) This configuration allows the ring to expand circumferentially and radially when exposed to centripetal forces induced by, for example, rotation of a turbopump's rotor.

The angle of faces 605 and 610 of each segment 350 are selected in such a way that as the flying wedge 205 grows radially it also translates axially along a mating conical face on the retainer 210. Face 600 is flat so that it can rest against the inner face of the ball bearing assembly 220. Surface 320 is the inner diameter surface which mates to the outer diameter of the preload ring 215. The outer diameter surface 615 is configured such that when the flying wedge expands radially, diametrical surface 615 comes in contact with a mating diametrical surface 240 on the retainer 210.

Other mechanical aspects of the flying wedge such as mid-rib 330 bearing surface rib 335, and conical surface rib 340 are discussed below.

4.4 Design Factors for a Flexible Flying Wedge

Figure 8:
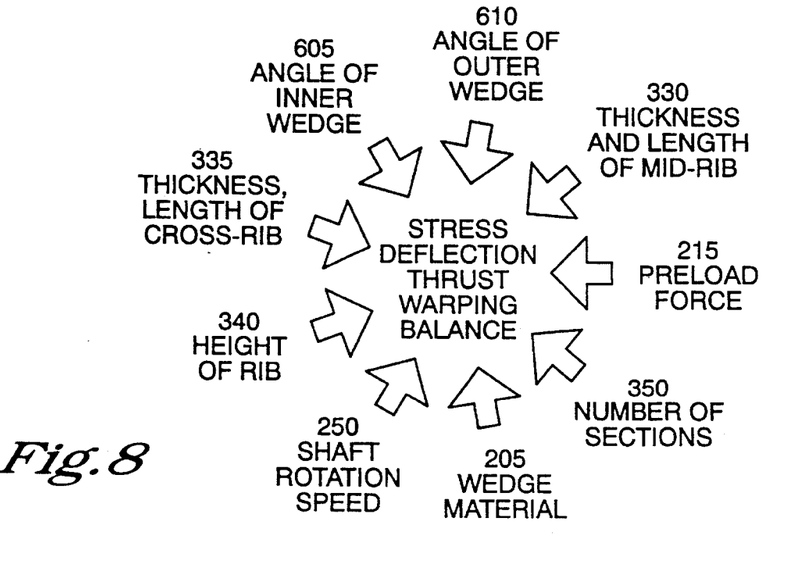
FIG. 8 shows how different aspects of the illustrative embodiment's flying wedge element can be modified to suit particular design requirements.

FIG. 8 shows graphically a number of design factors that can be varied as desired for a particular implementation of a flying wedge assembly. The stress, deflection, thrust, warping, and balance of the flying wedge 205 can be predetermined by changing one or more of the variables listed on the outer portion of FIG. 8.

The angle of face 605 can be varied to set the desired axial motion of the flying wedge. The axial thrust capability is also a function of the angle of face 605. The spring rate of the flying wedge 205 can be altered by changing the length, thickness, and height of the mid rib 330, bearing surface rib 335, and conical surface rib 340, and material used to fabricate the flying wedge. Changing the flying wedge's spring rate affects its motion versus rotational speed behavior. Another parameter which affects the flying wedge's spring rate is the total number of sections 350 in the flying wedge. (One section consists of one meridional slot pair, 300 and 305, from either side of the wedge.) More sections tend to decrease the spring rate while fewer sections tend to increase the spring rate.

4.5 Description of the Preload Ring and Retainer

Referring to FIG. 2, an important aspect of the preload ring 215 is that its outer diameter, surface 250, is greater than the inner diameter of the flying wedge 205, surface 320, when in a free unrestrained state. This difference in diameters determines the flying wedge's preload stress, at assembly, and designed lift-off speed. For example, the larger the interference fit between the two diameters, the higher the lift-off speed of the flying wedge 205.

In the unassembled condition, the smallest diameter of conical surface 245 must be less than the diameter of flying wedge surface 320 in order to assemble the flying wedge assembly (see FIG. 2). During assembly, retainer 210 is used as an axial support for flying wedge surface 605 which is placed against retainer surface 230 while the preload ring 215 is pressed into place. During operation, the flying wedge 205 expands and surface 610 is captured by retainer surface 235.

Retainer 210 includes a radial stop diametrical surface 240 which mates with flying wedge diametrical surface 615 to limit growth of the flying wedge 205 during operation. The diameter of surface 240 is selected to limit the flying wedge's stress by limiting its radial growth. The tapered surface 235 provides a guide for the flying wedge 205 to move in the axial direction as it grows radially. Retainer tapered surface 230 mates with flying wedge surface 605 to allow for axial thrust transmission during start-up transient operations and a restoring inclined surface during the shut-down transient operations. In this application, axial thrust is supplied via the ball bearing assembly 220.

Another important feature of the preload ring 215, not shown in FIG. 2, are pins that protrude radially from surface 235 into the slots of the flying wedge 300 and 305 (see FIG. 3b). These pins transmit force to the flying wedge so that it will rotate at the same speed as the shaft prior to and after the retracting motion.

4.6 Test Data for an Illustrative Implementation

Figure 9:
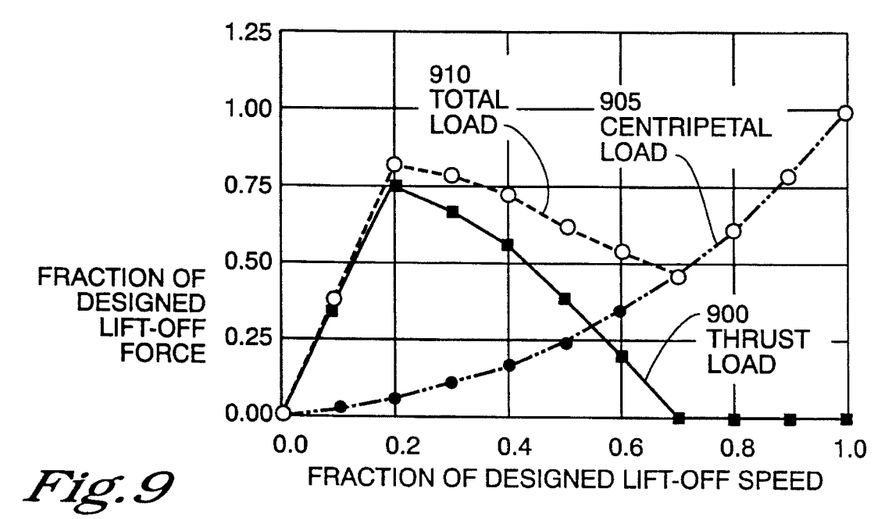
FIG. 9 shows the relationship between centripetal and thrust load within the flying wedge versus speed.

FIG. 9 shows a typical relationship between rotational speed, significant loads, and the fraction of the flying wedge's designed lift-off force. The thrust load line 900 represents the required axial thrust transmission of the pump. At low speeds, below approximately 20% of lift-off, the required thrust load is a maximum and decreases to zero at 70% of the design life-off speed. At 70% of the designed lift-off speed, the high and low pressure orifices, 125 and 130 respectively, regulate the cavity 120 pressure sufficient for the balance piston system to function. The centripetal load line 905 is a quadratic function representing the tensional hoop force in the flying wedge itself if it were not preloaded. The total load line 910, at any given speed, is the sum of the thrust and centripetal loads. The horizontal near the top of FIG. 9 represents the design preload level of the flying wedge. The flying wedge will not retract before the designed rotational lift-off speed is reached.

It is important to note that the total load 910 is always less than the required preload, up to the design lift-off speed. The wedge will not retract due to axial thrust. At speeds greater than 100%, the flying wedge's centripetal force overcomes the preload tension allowing the flying wedge to grow radially and move axially within the retainer.

To demonstrate the flying wedge assembly, a prototype was designed, fabricated and tested. The tests were conducted in a rig which simulated the fluid and axial load environment of the application turbopump, a MK29-FD turbopump. The following measurements were used to determine the success of the design concept: (1) test rig shaft speed, (2) bearing 220 inner race speed, (3) axial load piston pressure, and (4) bearing inner race position.

The test was conducted by applying pressure to the axial load piston to ensure that the bearing 220 and the flying wedge 205 were in solid contact. With the load constantly applied, torque was supplied to the rig's shaft to increase speed. The rig's shaft speed was increased at a constant rate to approximately 80% of the design lift-off speed to verify that the rig's shaft speed and the bearing inner race 220 speed were the same.

Figure 10:
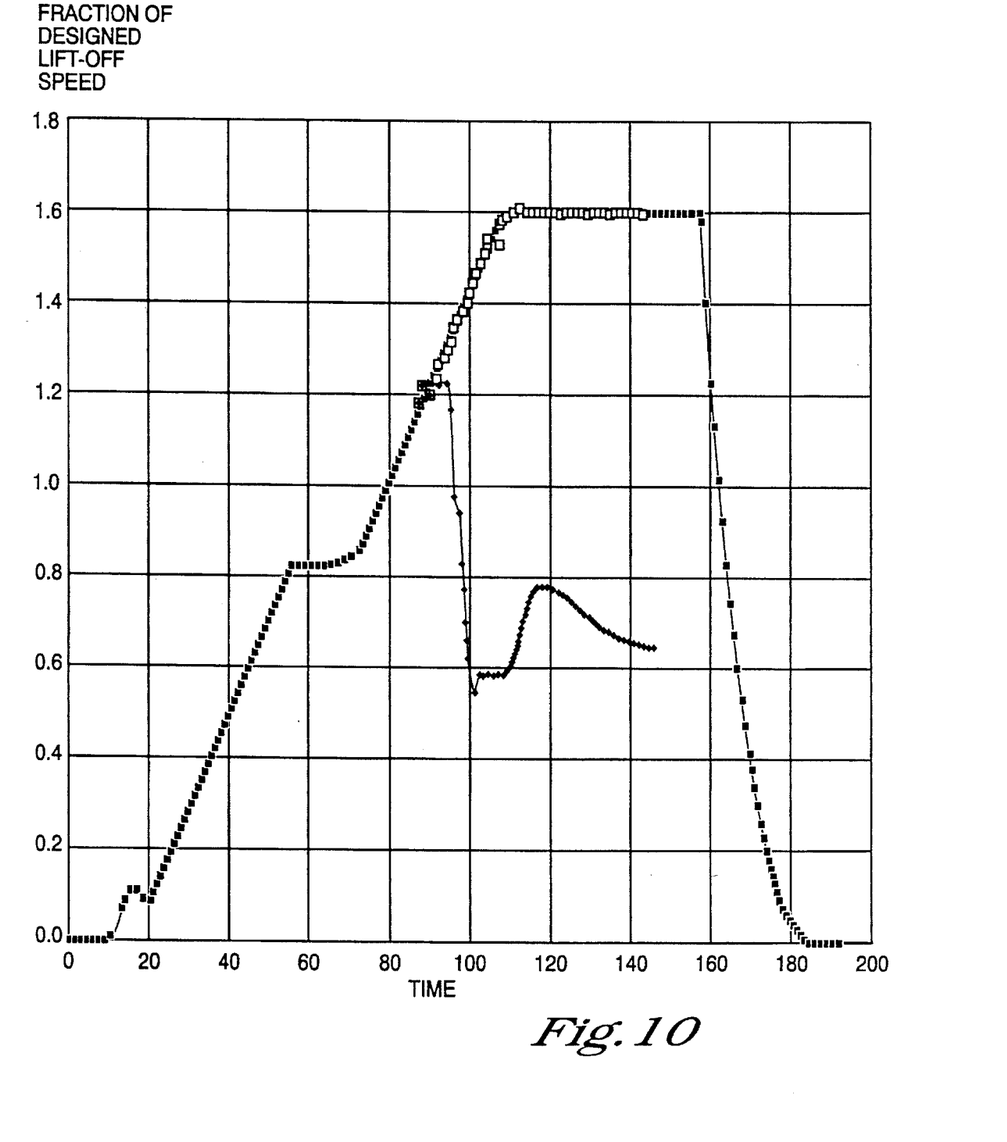
FIG. 10 shows test data for one specific implementation of the invention.

Next, the rig's shaft speed was increased at a constant rate to 160% of the designed lift-off speed. As seen in FIG. 10, at approximately 120% of the designed lift-off speed, the bearing inner race 220 slowed to approximately 50% of the testing speed. This indicates that the flying wedge had retracted. The bearing still rotates, driven by viscous forces, but at a greatly reduced speed.

FIG. 10 shows the relationship between time and the rotational speed of the inner race of bearing assembly 220. At the start of the test, at time 0, the turbopump's ball bearing assembly 220 is loaded against the contact face 600 of the flying wedge 205. As the turbopump's rotational speed increases, the flying wedge's inner ring surface 320 speed and shaft speed track essentially perfectly. At the demonstrated lift-off speed of approximately 120% of the designed lift-off speed, the flying wedge begins to retract away from the clutch bearing and, subsequently, the bearing inner race 220 reduces in speed while the main rotor shaft continues at its normal ramp speed until it levels at 160% of the designed lift-off speed. The increase in speed of the inner race 220, at approximately time 110 (60% of the designed lift-off speed), is due to viscous fluid forces and is not due to contact between the flying wedge and pump rotor 133.

It should be understood that the information in FIGS. 9 and 10 are presented solely for purposes of illustration and not as a necessary part of how to make and use the invention.

4.7 Advantages of the Invention

The flying wedge clutch assembly is a speed actuated coupling device that provides low speed axial load and torque transmission and disengages for increased shaft motion at higher speeds. The flying wedge clutch assembly is a compact and lightweight design, roughly equivalent to a conventional ball bearing assembly in a typical turbopump application. Advantageously, the flying wedge clutch assembly eliminates the transmission of axial thrust through rolling-element bearings in high speed rotating machines with radial hydrostatic bearings. This eliminates the speed and life limitations associated with conventional rolling-element bearings.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. A clutch assembly, comprising:

a ring assembly including a retainer member;

a radially expandable wedge member, said wedge member cooperatively configured with said retainer member to be axially moveable relative to said retainer member in response to rotation of said wedge member; and a preload ring member, said preload ring member cooperatively configured to be substantially stationary with respect to said retainer member and further to preload said wedge member.

2. A clutch assembly, comprising:

a ring assembly including a retainer member;

a generally annular wedge member having a generally serpentine configuration viewed from the diametrical center point of said wedge member; and a preload ring member, said preload ring member cooperatively configured to be substantially stationary with respect to said retainer member and further to preload said wedge member.

3. A clutch assembly, comprising:

a retainer member defining a generally radially inwardly extending lip and defining a generally circumferential groove;

a unitary wedge member comprising a plurality of stop faces, said stop faces coupled in circumferentially variable space relation to one another by a plurality of deflection portions, each said deflection portion coupled between two of said stop faces which are positioned generally adjacent one another; and a preload ring member, said preload ring member cooperatively configured to be substantially stationary with respect to said retainer member and further to preload said wedge member.

4. The clutch assembly of claim 3, wherein each of said stop faces includes at least one portion extending generally to define a plane, and wherein each said deflection portion has a generally U-shaped profile in a plane extending generally parallel to said plane established by said stop face.

5. A clutch assembly adapted to selectively transmit a force therethrough, said clutch assembly comprising:

a bearing assembly, said bearing assembly having a force transmitting engagement surface;

a retainer assembly, said retainer assembly lying in space relation from said bearing assembly, said retainer assembly defining a generally annular and radially outwardly extending groove, said grove defined at least in part by a bearing surface extending radially outwardly and in a direction away from said engagement surface of said beating assembly;

a wedge member assembly lying at least partially within said groove formed by said retainer member, said wedge assembly movable within said groove from a radially inward position to a radially outward position, said wedge assembly translatable from a first longitudinal position to a second longitudinal position in response to movement between said first and second radial positions, said wedge member including a second bearing surface, and said longitudinal movement of said wedge member in response to said radial movement of said wedge member being accomplished at least in part by engagement of said second beating surface with said first bearing surface of said retainer assembly.

6. The clutch assembly of claim 5, wherein said second bearing surface of said wedge member is formed of a plurality of circumferentially spaced segments, each said segment supported by a projection extending generally longitudinally away from said engagement surface of said wedge member assembly.

7. The clutch assembly of claim 6, wherein each said projection has a generally U-shaped cross section viewed from the diametrical center-point of said annular wedge member.

* * * * *